2,694,007

METHOD FOR THE MANUFACTURE OF UNIFORM, HIGH-DENSITY, HIGH-TEMPERATURE RESISTANT ARTICLES

Claus G. Goetzel, Yonkers, and Robert L. Pettibone, New York, N. Y., assignors to Sintercast Corporation of America, a corporation of New York Application September 12, 1950, Serial No. 184,392

11 Claims. (Cl. 75—204)

This invention relates to the manufacture of uniform, high-density, high-temperature resistant articles by infiltration or impregnation of porous, refractory metal carbide bodies or skeletons with lower melting metals or alloys of comparatively high corrosion resistance, strength and ductility at an elevated temperature.

It is an object of the invention to adapt manufacturing methods as well as compositions and starting materials of the type above referred to to a skeleton of titanium carbide (TiC) resulting in a product of exceptional properties.

The articles having TiC as skeleton material and major volumetric constituent may be used at temperatures of 900 to 1100° C. and above and will, therefore, be suitable for jet engines, turbines, and other power engines. The reason for this is that titanium carbide is one of the most stable and oxidation resistant carbides of the refractory metals, whereas tungsten carbide, tantalum carbide, columbium carbide, or molybdenum carbide decompose comparatively rapidly when exposed to air or oxidizing combustion gases at temperatures of 900 to 1100° C.

Furthermore, titanium carbide has a density of only 4.9 grams per cc., or about 60% of that of the conventional type of super-alloys used for turbine blades, buckets, nozzle vanes, and similar parts in jet engines. This is obviously most important for components subjected to centrifugal force and allows weight saving as the cross-section of engine parts subjected to high temperature may be reduced.

Titanium carbide is a very high melting, very hard compound which compares in its physical properties, including its strength at normal and elevated temperatures, to other refractory carbides, e. g. tungsten carbide and tantalum carbide. Since the absolute values of its strength are about the same but the density of TiC is only about ⅓ of tungsten carbide and ½ of tantalum carbide, the strength-weight ratio is much more favorable than in either one of the other materials.

Titanium carbide is composed of the two elements, Ti and C, which are generally available and are particularly abundant in the United States. The material is, therefore, considered as non-strategic in character, in contrast to the presently employed super-alloys that contain the strategic element cobalt in major proportion.

It has been well known in the art that the method of forming composite structures of a high melting substance and a low melting alloy phase by infiltrating the latter into a sponge-like skeleton shape of the high melting component produces articles of a high degree of density, uniformity and soundness, without undergoing such drastic changes in shape and dimensions, e. g. shrinkage, as are encountered when a mixture of the high melting and low melting constituents are subjected to conventional sintering techniques. It is also a well-known fact that the infiltration process produces composite structures, whose high melting skeleton phase and lower melting infiltrant metal phase form a closely interwoven or intertwined network having unusual physical properties derived from cumulative predominant properties of the two phases. The infiltration technique permits ready production of composite bodies having an ideal combination of chemical and physical properties, in which the volumetric ratio of the two phases may vary over a much wider or a different range, including the 50/50 by volume ratio, than would be possible or practical by the conventional powder metallurgy methods or cold pressing and sintering, whose concurrent shrinkage effects cause limitations of the range, or hot pressing, whose concurrent loss of binder by sweating out also cause limitation of the range.

For the foregoing reasons, the application of infiltration technique to the production of composite bodies having TiC as the major or skeleton forming constituent is obviously desirable.

However, infiltration of skeleton bodies produced from TiC powder with lower melting metals or alloys cannot readily be accomplished. Pure TiC has very little chemical affinity or wetting property towards iron, nickel, and cobalt, and its solubility in these metals at elevated temperatures, i. e. up to 1400° C., is extremely limited. Therefore, infiltration with the aid of capillary action is difficult to accomplish, and not even very small cross-sections can be penetrated by the liquid infiltrant, except in regions strictly limited to the surface in contact with the infiltrant.

It is, therefore, an important object of the invention to remedy such deficiencies of TiC and to provide operative conditions which permit a complete penetration of the pores of the TiC skeletons.

This object can be attained by changing the chemical composition of the TiC surface areas which must make contact with the infiltrant and increase the degree of chemical affinity or of the solubility of the surface areas of the TiC brought in contact with the liquid infiltrant alloy; in cooperation with and in fulfilment of these measures a special type of the TiC powder is used.

One way to accomplish such conditioning of the TiC for infiltration consists in the introduction of a minor quantity of the infiltrant metal or alloy, or of the major metal constituent thereof in the form of a coating that covers the walls of the interconnected pores of the TiC skeleton and functions as a "pilot" metal constituent facilitating the infiltration process. It was found that a pilot metal of about 3 to 6% by volume or 5 to 10% by weight of the TiC powder gave good results.

An effective manner of applying such metallic coating to the pore wall areas of a TiC skeleton consists in the fine-disintegration of the TiC powder and of the binder metal powder, for instance, in a ball mill, whereby the binder metal is smeared onto the TiC powder particles from which the skeleton is made.

Another effective manner of producing the binder metal coating comprises the use of colloidal or fine flake metal or alloy powder suspensions in an organic solvent, e. g. alcohol or CCl4, and flushing these suspensions through the interconnected pore system of the skeleton body prior to its infiltration. However, the first mentioned procedure is preferred.

Another important aspect of this invention is that the "pilot" metal or alloy-coated TiC powder is most susceptible to the formation of strong and coherent skeleton bodies that can be safely handled prior to the infiltration step, as the metal or alloy coating acts as a strong binder.

Various methods of forming the skeleton bodies may be used for the purposes of the invention, such as cold-pressing, preferably in conjunction with rampacking and dynamic loading, as described in copending patent application Serial No. 787,514 filed November 22, 1947 by John L. Ellis et al. or hot-pressing, preferably at temperatures corresponding to those of noticeable solubility between the TiC and the metal or alloy coating, e. g. 1400–1700° C. as described in copending patent application, Serial No. 795,101, filed December 31, 1947 by Claus G. Goetzel et al. In the latter application the operation must be controlled in such a manner that the interconnected pore system is not destroyed in the process of compaction.

As will be later explained more in detail, the presence of an additional element in the TiC powder, that forms a gaseous and volatile reaction product and which, upon escape from the forming skeleton, leaves channels and junctures between the pores is of considerable importance.

A subsequent heat treatment under carefully controlled atmospheric conditions further aids the strengthening of the TiC skeleton body. In the case of a cold-pressed, rampacked and dynamically loaded skeleton, this treatment constitutes a sintering operation of the coated TiC particles; the coating performing the function of a binder during pressing and of a cement during sintering. By carefully timing the heat treatment and employing a temperature low enough, for instance 1400–1500° C., to permit only superficial solubility between the TiC and the metal or alloy phase and reducing the treatment to a period of about ½ to 1½ hours, shrinkage of the skeleton bodies can be kept in the order of zero to two per cent and the interconnected pore system can be preserved. In this case, the presence of a pore-channel creating element, such as carbon, is of importance. In spite of this limited consolidation and shrinkage, the cohesive strength of the skeleton is augmented manyfold by this treatment.

Similar heat treatments, for instance, sintering, performed on hot-pressed TiC skeletons also has a strengthening effect. Furthermore, the treatment serves to clean the skeleton body of superficial impurities originating in the hot-press operation, e. g. adherent carbon, lubricant, etc., thereby freeing the pore channels at the surfaces. It also serves for the removal by volatilization or any remainder of additional pore channel creating element. The heat treatment of hot-pressed TiC skeletons is preferably carried out at somehat higher temerpatures, e. g. 1450–1650° C.

In the sintering heat treatment, the cold-pressed or hot-pressed TiC skeletons are preferably submerged inside a suitable vessel in an inert powder pack, such as a stable refractory oxide, for instance, alumina, magnesia or beryllia, or a degasified type of carbon, for instance, Norblack, Thermatomic Carbon. Highly desiccate hydrogen furnace atmosphere is passed through the pack and permitted to contact and penetrate the TiC skeleton bodies. Other atmospheres found suitable are helium or argon at atmospheric pressure or in a partial vacuum.

The selection of the type and grade of the TiC powder is, as mentioned before, extremely important for the production of skeletons that will be strong and coherent during heat treatment.

A TiC powder of relatively high purity and with a low free carbon content, e. g. T. C. 17.10%, F. C. 0.08%, C. C. 17.02% where T. C. stands for total carbon, F. C. for free carbon and C. C. for combined carbon contents, contains a significant proportion of free Ti, for instance, about 9.85%. This type of powder is used for the manufacture of cutting tools and similar applications where the excessive presence of free carbon would be harmful. In clean atmosphere this free titanium will not combine during hot pressing and/or sintering, with nitrogen or oxygen, but rather with the metal or alloy that is being used for the coating of the particles and pore walls. Thus, Ti-bearing alloys will be formed in situ; volumetric changes, such as shrinkage or distortions will occur, because the Ti-bearing alloy phases will be substantially in the liquid state during the sintering treatment, and will assume major volumetric proportions. While microscopic examination does not reveal free Ti, the free metallic Ti in the low free carbon containing TiC can be noticed in the X-ray diffraction pattern and, therefore is present in the carbide crystals.

It is difficult to infiltrate skeleton bodies produced from this powder in accordance with the above described processes. The alloying of the free Ti with the binder apparently disrupts the continuity of the pore structure and creates obstacles to smooth and complete infiltration.

Thus, local stresses are set up during infiltration and the composite bodies become distorted, warped, and may even display cleavages and cracks. As a direct consequence of the blocking of the free passages, the infiltrant tends to break the sinter-bonds of the skeleton and causes a swelling or even partial incoherence of the skeleton body. This is particularly the case when the quantity of infiltrant exceeds the quantity required to fill all the pores of the skeleton body. This phenomenon may result in a gross increase in volume, amounting to as much as 20% in some instances. The penetration of the infiltrant may occur with such turbulance that individual TiC grains, or even entire aggregates of TiC particles are broken from the skeleton and swept by the infiltrant along the free passages. The physical properties at ordinary and elevated temperatures will be correspondingly poor and will vary over a wide range.

The appearance of infiltrated TiC bodies of the above described type is shown in the attached Figs. 1 and 2.

The physical properties of these test bars are given in the following Table I:

TABLE I

*Physical properties of infiltrated titanium carbide composites from low free carbon-containing titanium carbide powder*

| | Transverse Rupture at Room Temp., p. s. i. | Transverse Rupture at 1,000° C., p. s. i. | Deflection under Break Load at 1,000° C., in. |
|---|---|---|---|
| Skeleton Composition: TiC-Ni binder, 90–10 weight ratio: | | | |
| Low TiC Concentration (approx. 60% by Vol.), Nichrome Infiltrant | 39,700–148,000 | 31,000–85,500 | 0.033–0.053 |
| High TiC Concentration (approx. 75% by Vol.), Nichrome Infiltrant | 40,200–100,700 | 70,400–85,800 | 0.039–0.042 |
| Skeleton Composition: TiC-Co binder, 90–10 weight ratio: | | | |
| Low TiC Concentration (approx. 60% by Vol.), Stellite #21 Infiltrant | 50,000–147,100 | 62,600–92,100 | 0.015–0.052 |
| High TiC Concentration (approx. 75% by Vol.), Stellite #21 Infiltrant | 50,400–96,800 | 66,400–102,500 | 0.027–0.036 |

The conditions inherent in the infiltration of chemically pure TiC skeletons, made from a powder containing only a nominal amount of free carbon, do not exist when a different type of TiC powder is used and when the processing steps are correspondingly adjusted.

If a TiC powder, rich in free carbon, e. g. T. C. 20.0–20.3, F. C. 2.2–2.9, C. C. 17.7–18.0, having a correspondingly lower free Ti content, not exceeding 5.00%, is used, and especially if such powder is subjected to a refining and purification heat treatment in pure hydrogen atmosphere at 2000–2300° C., then skeleton bodies can be produced having such strength and coherence as to eliminate any and all deformations, volumetric or local stress concentrations causing cleavages and cracks; such skeleton bodies will not undergo swelling and gross volume increases upon infiltration, even though the amount of infiltrant may be uncontrolled, and considerably in excess of the value calculated to fill all pores of the skeleton, in which case the excess of infiltrant would simply accumulate on and spread over the surface of the composite body. This is apparent from Figs. 3 and 4, showing test bars, made according to the invention.

Figure 1:
Fig. 1 shows a test bar made from a low free carbon TiC powder coated with 10 per cent Ni and infiltrated with Nichrome.
Figure 2:
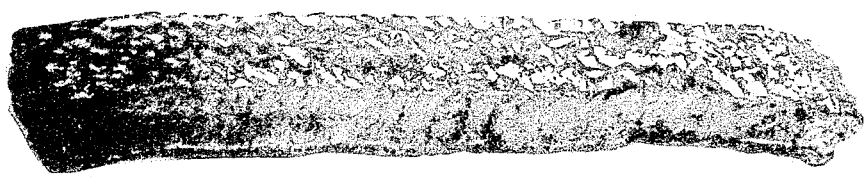
Fig. 2 shows a test bar made from a low free carbon TiC powder coated with 10 per cent Co and infiltrated with Stellite.
Figure 3:
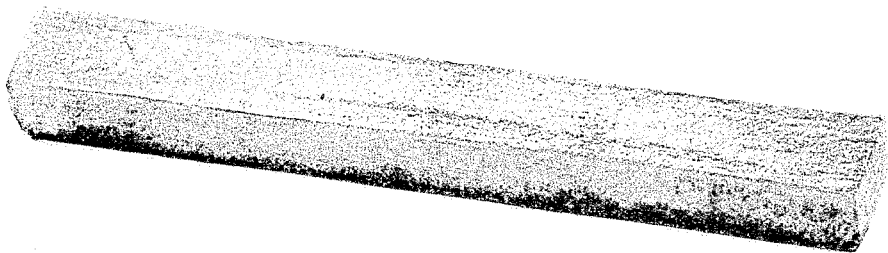
Figure 4:
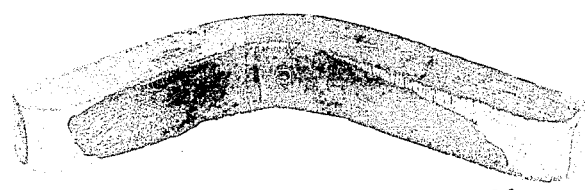

Fig. 3 shows a test bar made of high free carbon TiC coated with nickel and infiltrated with Nichrome;

Fig. 4 shows the same bar after a transverse rupture test at 1000° C.

The physical properties obtainable in the infiltrated composite TiC bodies will, therefore, be of a considerably higher order and will vary over a considerably smaller range; than would be the case otherwise.

The physical properties of these test bars are given in the following Table II:

TABLE II

*Physical properties of infiltrated titanium carbide composites from high free carbon-containing titanium carbide powder*

| | Transverse Rupture at Room Temp., p. s. i. | Transverse Rupture at 1,000° C., p. s. i. | Deflection under Break Load at 1,000° C., in. |
|---|---|---|---|
| Skeleton Composition: TiC-Ni Binder, 90-10 weight ratio: | | | |
| Low TiC Concentration (approx. 60% by Vol.), Nichrome Infiltrant | 83,700–216,000 | 60,400–82,700 | 0.060–0.238 |
| High TiC Concentration (approx. 75% by Vol.), Nichrome Infiltrant | 79,500–138,000 | 78,400–88,100 | 0.035–0.228 |
| Skeleton Composition: TiC-Co Binder, 90-10 weight ratio: | | | |
| Low TiC Concentration (approx. 60% by Vol.), Stellite #21 Infiltrant | 74,200–188,500 | 115,000–167,700 | 0.058–0.215 |
| High TiC Concentration (approx. 75% by Vol.), Stellite #21 Infiltrant | 83,000–141,900 | 91,000–149,300 | 0.031–0.200 |

A comparison of the data from Tables I and II shows that the use of the powder having a high percentage of free carbon surprisingly improves the composites which are produced by coating the TiC with, for instance, 10% by weight of Co as a binder and which are subsequently infiltrated with Stellite #21 (Vitallium).

That these improvements are attributable to the presence of the free carbon is indicated by experiments converting the high free carbon grade of the TiC into a low free carbon grade by alternate hydrogen and vacuum treatments at 2300° C. The resultant structure had much inferior physical properties than specimens made from the high free carbon containing powder.

The beneficial effects of from 1 to about 3% free carbon in the TiC powder will now be summarized.

The carbon originating from the carburization of Ti dioxide by solid or gaseous reagents is present in a finely divided form, and is uniformly dispersed over the surfaces of the TiC particles. The carbon acts, therefore, as an ideal lubricant and facilitates both cold- and hot-pressing. It makes possible the pressing of strong, coherent skeleton bodies of much lower density, e. g. volume concentration, than would be possible with the low free carbon containing powder, the lowest particle density being about 55% as against 65–70% for the other type of powder. This comparatively low skeleton volume concentration results in an optimum combination of resistance to oxygen, strength and ductility at elevated temperatures.

In hot-pressing, part of the free carbon combines with the gases entrapped in the TiC powder, e. g. oxygen from the air or hydrogen from the controlled furnace atmosphere, to form carbon monoxide, hydrocarbons, or other carbon containing gaseous products. These gases tend to escape from the compact as the temperature of hot-pressing rises, thereby leaving behind channels which connect the different pores; this, in turn, facilitates rapid and complete infiltration allowing a minimum of time for the effects of a harmful solubility, stress concentration, and local distortion. The production of an interconnected pore structure with the aid of the carbon containing gaseous reaction products cannot be completed during the short hot-pressing, i. e. 1 to 10 minutes, but will be completed during the subsequent heat treatment, i. e. sintering of the hot-pressed skeleton. An analogous process takes place in cold-pressed skeletons that are subsequently sintered.

When comparing the strength and the behavior of the skeletons of the low free carbon and high free carbon containing titanium carbide powder during infiltration, it becomes obvious that the increased strength produced by the cementing of the cobalt or nickel binder during sintering is originally overshadowed most markedly by a bonding or alloying process caused by the presence of free carbon in the TiC powder. This is especially noticeable when cobalt is the binder metal and cobalt-base Stellite and Vitallium alloys are the infiltrant. From the constitution of the system cobalt-carbon, it may be concluded that a considerable amount of carbon is dissolved by cobalt at elevated temperatures; this may amount to as much as 1.1% at the eutectic temperatures of 1300° C. In addition to the primary Co-solid solution, in which 0.1% C is dissolved, and free carbon, the Co-C eutectic is present in the structure. Since it is known that in the molten state molecules of the compound $Co_3C$ with 6.35% C are stable, and this cobalt carbide compound decomposes only slowly upon slow cooling and solidification, it must be assumed that the markedly increased rigidity of the cobalt-cemented TiC-base skeleton at the instance and temperature of infiltration is caused by the presence of the cobalt-carbide. Microscopic examination of skeleton bodies and infiltrated composites of the high free carbon-type powder has shown foreign phase border zones on TiC particles. This foreign phase was found to be hard and tenacious and of similar character as the TiC particles themselves, and it evidently constituted the binder metal with part of the free carbon contained therein, as cobalt carbide.

In the Ni-C system, the stable Ni carbide compound $Ni_3C$ with 6.38% C exists in the molten state and down to about 1600° C., i. e. the upper temperature limit used during sintering; at lower temperatures down to 1400° C., the nickel carbide compound decomposes to a considerable degree. Therefore, the strength of the skeleton body during infiltration cannot be influenced by the presence of carbon in the nickel binder, to the same extent as in the case of the cobalt binder.

According to experimental evidence, optimum physical properties are obtained when a high free carbon containing powder is subjected to a refining heat treatment in dry hydrogen atmosphere at 2000–2300° C. Mere heating of the powder in a sealed carbon container, without the use of any addition agents or elements, results in a reduction of the free carbon content by about ¼–½, e. g. from 2.3–2.5 to 1.2 to 1.9% and a corresponding increase of the combined carbon content, resulting in practically no change of the total carbon content of 20.0 to 20.3. Moreover, such treatment burns out any residual impurities and will decompose and reduce any $TiO_2$ present in the original powder and convert the resulting Ti metal into TiC. Accordingly the amount of free Ti is reduced by ¼–¾ and thereby the adverse effects connected with the alloying tendency of the metallic Ti with the metal binder during sintering and infiltration are also considerably reduced, or entirely eliminated.

These reduction and carburization reactions may be the reasons why the physical properties of the heat treated and refined high free carbon containing TiC powder base materials are about 20% superior to material made from the non-heat treated high free carbon grade powder. Another reason may be that an excessive amount of free carbon, e. g. about 2.0%, may result in agglomeration of the carbon in the skeleton, which may in turn prevent the complete and uniform penetration of the infiltrant and produce gas pockets or other regions of mechanical weakness. A comparison of the physical properties obtained with cobalt alloy infiltrated TiC made from non-heat treated and heat treated high carbon containing TiC powder is given in the following Table III:

TABLE III

*Physical properties of infiltrated titanium carbide composites from high free carbon-containing titanium carbide powder* [1]

NON-HEAT TREATED VS. HEAT TREATED TITANIUM CARBIDE POWDER

| | Transverse Rupture at Room Temperature | Transverse Rupture at 1,000° C., p. s. i. | Deflection under Break Load at 1,000° C., in. |
|---|---|---|---|
| Non-Heat Treated Titanium Carbide | 92,300 | 108,500 | .072 |
| | 119,900 | 108,500 | .106 |
| | 164,900 | 117,200 | .147 |
| | 125,200 | 126,000 | .121 |
| Heat Treated Titanium Carbide | 110,400 | 124,000 | .112 |
| | 142,000 | 127,000 | .130 |
| | 172,200 | 132,000 | .218 |
| | 166,000 | 130,500 | .197 |

[1] Skeleton composition, TiC-Co binder, 90-10 weight ratio. Low TiC concentration (approx. 60% by volume), infiltrated with Stellite #21.

The following examples, describing the production of a bar-shaped article, illustrate the invention more in detail:

EXAMPLE 1

A high free carbon containing TiC powder of a 325 mesh size and containing 75.96 per cent Ti, 18.00 per cent C. C. and 2.53 per cent F. C. is charged into a graphite crucible and heat-treated in a dry hydrogen atmosphere at a temperature of 2300° C. for a period of about thirty minutes. An agglomeration takes place of the powder; the agglomerated mass is crushed and passed through a 140 mesh screen.

10 weight per cent of cobalt powder of a 325 mesh size are mixed with the titanium carbide powder; the mixture is finely disintegrated in a stainless steel ball mill for twenty-four hours.

14 grams of the powder mixture are charged in a graphite mold and hot-pressed in the same at a temperature of 1650° C. into a bar-shaped skeleton having a density of about 60 per cent by volume, whereupon the article is sintered in a graphite boat in Norblack pack at a temperature of 1500° C. for about one hour and in a dry hydrogen atmosphere to burn away impurities.

The skeleton is now put in an Alundum boat located in a graphite carrier and infiltrated with 14.31 grams of Stellite for a period of twenty minutes at a temperature of 1530° C.

The density of the final bar is 6.44 g./cc., and the total weight 28.31 grams.

EXAMPLE 2

The procedure, as described in Example 1, is changed insofar as the powder mixture is hot-pressed at 1600° C., to a density of about 75 per cent by volume; the final density of the bar is in this case 6.04 g./cc. and the total weight 27.85 grams, of which 17.5 grams are the weight of the skeleton and 10.35 grams of the infiltrant.

EXAMPLE 3

A high free carbon containing TiC powder of a 325 mesh size and containing 75.96 per cent Ti, 18.00 per cent C. C. and 2.53 per cent F. C. is charged into a graphite crucible and heat-treated in a dry hydrogen atmosphere at 2300° C. for a period of about thirty minutes. An agglomeration takes place of the powder; the agglomerated mass is crushed and passed through a 140 mesh screen.

A mixture of 90 per cent of this treated TiC powder is mixed with 10 per cent carbonyl nickel powder; the mixture is finely disintegrated in a stainless steel ball mill for twenty-four hours.

14.25 grams of the powder mixture are charged in a graphite mold and hot-pressed in the same at a temperature of 1650° C., into a bar-shaped skeleton having a density of 61 per cent by volume, whereupon the article is sintered in a graphite boat in Norblack pack at 1500° C. for about one hour and in a dry hydrogen atmosphere to burn away impurities.

The skeleton is now put in an Alundum boat located in a graphite carrier and infiltrated with 13.80 grams of Nichrome for a period of twenty minutes at 1530° C.

The density of the final bar is 6.40 g./cc., and the total weight 28.05 grams.

We claim:

1. In a method for the production of substantially non-porous, heat-resistant titanium carbide articles, said articles having an improved combination of physical properties at ordinary and elevated temperatures, the steps comprising mixing titanium carbide powder containing about 1% to 3% of free carbon with about 2% to 12% by weight of a binder metal powder having a chemical affinity for the free carbon, finely disintegrating the mixed powders whereby particles of the free-carbon-containing titanium carbide powder are coated with said binder metal, shaping the coated titanium carbide particles and binder metal powder mixture into a porous, skeleton body having an interconnected pore system therethrough, subjecting the thus-shaped porous, skeleton body to a skeleton-strengthening treatment comprising heating said skeleton body at an elevated temperature sufficiently high to promote superficial solution between the free carbon, the titanium carbide particles, and the said binder metal coating thereon, thereby producing on said titanium carbide particles a tenacious border zone, and thereafter infiltrating the thus-strengthened porous, skeleton body with an infiltrant metal containing said binder metal, the border zone on said titanium carbide particles forming a tenacious cement between said skeleton and the infiltrant metal, whereby a high-strength, coherent, dense, infiltrated titanium carbide body is produced.

2. The method of claim 1 in which the binder metal is a metal selected from the group consisting of cobalt, iron, and nickel in amounts of about 2% to 12% by weight of the titanium carbide, in which the skeleton-strengthening treatment is conducted at a temperature at least about 1400° C. but not exceeding about 1650° C. and in which the infiltrant metal is comprised substantially of said binder metal selected from the group consisting of cobalt, iron and nickel.

3. In a method for the production of substantially non-porous, heat-resistant titanium carbide articles, said articles having an improved combination of physical properties at ordinary and elevated temperatures, the steps comprising mixing titanium carbide powder containing about 1% to 3% by weight of free carbon with about 5% to 10% by weight of a binder metal taken from the group consisting of cobalt, iron, and nickel, finely disintegrating the mixed powders whereby particles of the free-carbon-containing titanium carbide powder are coated with said binder metal, cold pressing the coated titanium carbide particles and binder metal powder mixture into a porous, skeleton body having an interconnected pore system therethrough, subjecting the cold pressed porous, skeleton body to a skeleton-strengthening treatment comprising heating said skeleton body at an elevated temperature of about 1400° C. to 1500° C. for about ½ to 1½ hours and thereafter infiltrating the thus-strengthened porous, skeleton body with an infiltrant metal comprised substantially of said binder metal.

4. In a method for the production of substantially non-porous, heat-resistant titanium carbide articles, said articles having an improved combination of physical properties at ordinary and elevated temperatures, the steps comprising mixing titanium carbide powder containing about 1% to 3% of free carbon with about 5% to 10% by weight of a binder metal taken from the group consisting of cobalt, iron, and nickel, finely disintegrating the mixed powders whereby particles of the free-carbon-containing titanium carbide powder are coated with said binder metal, hot pressing the coated titanium carbide particles and binder metal powder mixture into a porous, skeleton body having an interconnected pore system therethrough, subjecting the hot pressed porous, skeleton body to a skeleton-strengthening treatment comprising heating said skeleton body at an elevated temperature of about 1450° C. to 1650° C. for about one hour, and thereafter infiltrating the thus-strengthened porous, skeleton body with an infiltrant metal comprised substantially of said binder metal.

5. In a method for the production of substantially non-porous, heat-resistant titanium carbide articles, said articles having an improved combination of physical properties at ordinary and elevated temperatures, the steps including subjecting a titanium carbide powder containing free carbon in amounts from about 1% to 3% to a refining treatment comprising heat treating said titanium carbide powder at a temperature ranging from about 2000° C. to 2300° C., mixing said heat-treated powder with about 2% to 12% by weight of a binder metal powder, finely disintegrating the mixed powders whereby the heat-treated titanium carbide particles are coated with said binder metal, shaping the coated titanium carbide particles and binder metal powder mixture into a porous skeleton body having an interconnected pore system therethrough, subjecting the thus-shaped porous, skeleton body to a skeleton-strengthening treatment comprising heating said skeleton body at an elevated temperature of at least about 1400° C. but not exceeding 1650° C. to promote superficial solution between the free carbon, the titanium carbide particles, and the said binder metal coating thereon, thereby producing on said titanium carbide particles a tenacious border zone, and thereafter infiltrating the thus-strengthened porous, skeleton body with an infiltrant metal containing said binder metal, the border zone on said titanium carbide particles forming a tenacious cement between said skeleton and the infiltrant metal, whereby a high-strength, coherent, dense, infiltrated titanium carbide body is produced.

6. In a method for the production of substantially non-porous, heat-resistant titanium carbide articles, said articles having an improved combination of physical properties at ordinary and elevated temperatures, the steps including subjecting a titanium carbide powder containing about 1% to 3% of free carbon to a refining treatment comprising heat treating said titanium carbide powder in a reducing atmosphere at a temperature ranging from about 2000° C. to 2300° C., mixing said heat-treated powder with about 2% to 12% by weight of a binder metal powder selected from the group consisting of cobalt, iron, and nickel, finely disintegrating the mixed powders whereby the heat-treated titanium carbide particles are coated with said binder metal, cold pressing the coated titanium carbide particles and binder metal powder mixture into a porous, skeleton body having an interconnected pore system therethrough, subjecting the cold pressed porous, skeleton body to a skeleton-strengthening treatment comprising heating said skeleton body at an elevated temperature of about 1400° C. to 1500° C. for about ½ hour to 1½ hours and thereafter infiltrating the thus-strengthened porous, skeleton body with an infiltrant metal containing said binder metal selected from the group consisting of cobalt, iron and nickel.

7. In a method for the production of substantially non-porous, heat-resistant titanium carbide articles, said articles having an improved combination of physical properties at ordinary and elevated temperatures, the steps including subjecting a titanium carbide powder containing about 1% to 3% of free carbon to a refining treatment comprising heat treating said titanium carbide powder in a reducing atmosphere at a temperature ranging from about 2000° C. to 2300° C., mixing said heat-treated powder with about 2% to 12% by weight of a binder metal powder selected from the group consisting of cobalt, iron, and nickel, finely disintegrating the mixed powders whereby the heat-treated titanium carbide particles are coated with said binder metal, hot pressing the coated titanium carbide particles and binder metal powder mixture into a porous, skeleton body having an interconnected pore system therethrough, subjecting the hot pressed porous, skeleton body to a skeleton-strengthening treatment comprising heating said skeleton body at an elevated temperature of about 1450° C. to 1650° C. for about one hour, and thereafter infiltrating the thus-strengthened porous, skeleton body with an infiltrant metal containing said binder metal selected from the group consisting of cobalt, iron and nickel.

8. In a method for the production of substantially non-porous, heat resistant titanium carbide articles, said articles having an improved combination of physical properties at ordinary and elevated temperatures, the steps including subjecting a titanium carbide powder containing about 1% to 3% of free carbon to a refining treatment comprising heat treating said titanium carbide powder in an atmosphere of substantially dry hydrogen at a temperature ranging from about 2000° to 2300° C., mixing said heat-treated powder with about 5% to 10% by weight of cobalt metal powder, finely disintegrating the mixed powders whereby the heat-treated titanium carbide particles are coated with said cobalt, cold pressing the coated titanium carbide particles and cobalt metal powder mixture into a porous, skeleton body having an interconnected pore system therethrough, subjecting the cold pressed porous, skeleton body to a skeleton-strengthening treatment comprising heating said skeleton body at an elevated temperature of about 1400° C. to 1500° C. for about ½ hour to 1½ hours, and thereafter infiltrating the thus-strengthened porous, skeleton body with an infiltrant metal selected from the group consisting of cobalt and cobalt alloys.

9. In a method for the production of substantially non-porous, heat-resistant titanium carbide articles, said articles having an improved combination of physical properties at ordinary and elevated temperatures, the steps including subjecting a titanium carbide powder containing about 1% to 3% of free carbon to a refining treatment comprising heat treating said titanium carbide powder at a temperature ranging from about 2000° C. to 2300° C. in an atmosphere of substantially dry hydrogen, mixing said heat-treated powder with about 5% to 10% by weight of cobalt metal powder, finely disintegrating the mixed powders whereby the heat-treated titanium carbide particles are coated with said cobalt, hot pressing the coated titanium carbide particles and cobalt metal powder mixture into a porous, skeleton body having an interconnected pore system therethrough, subjecting the hot pressed porous, skeleton body to a skeleton-strengthening treatment comprising heating said skeleton body at an elevated temperature of about 1450° C. to 1650° C. for about one hour, and thereafter infiltrating the thus-strengthened porous, skeleton body with an infiltrant metal selected from the group consisting of cobalt and cobalt alloys.

10. The method of claim 8 in which the binder metal is carbonyl nickel powder and in which the infiltrant metal is selected from the group consisting of nickel and nickel alloys.

11. The method of claim 9 in which the binder metal is carbonyl nickel powder and in which the infiltrant metal is selected from the group consisting of nickel and nickel alloys.

References Cited in the file of this patent

UNITED STATES PATENTS

| Number | Name | Date |
|---|---|---|
| 1,842,103 | Laise | Jan. 19, 1932 |
| 1,910,532 | Fetkenheuer | May 23, 1933 |
| 2,084,349 | Laise | June 22, 1937 |
| 2,193,413 | Wright | Mar. 12, 1940 |
| 2,286,672 | De Lamatter | June 16, 1942 |
| 2,422,439 | Schwarzkopf | June 17, 1947 |
| 2,515,463 | McKenna | July 18, 1950 |

OTHER REFERENCES

"Metal Progress," May 1951, p. 664. (Copy in Scientific Library.)